United States Patent [19]

Lehureau et al.

[11] Patent Number: 5,134,516
[45] Date of Patent: Jul. 28, 1992

[54] DEVICE FOR THE PROJECTION OF IMAGES

[75] Inventors: Jean-Claude Lehureau, Ste Genevieve des Bois; Bruno Mourey, Palaiseau, both of France

[73] Assignee: Thomson-CSF, Puteaux, France

[21] Appl. No.: 669,572

[22] Filed: Mar. 14, 1991

[30] Foreign Application Priority Data

Apr. 3, 1990 [FR] France .................. 90 04237

[51] Int. Cl.$^5$ .................................. G02F 1/29
[52] U.S. Cl. ..................... 359/301; 359/495
[58] Field of Search ........... 359/298, 301, 302, 303, 359/304, 36, 37, 494, 495, 496, 497

[56] References Cited

U.S. PATENT DOCUMENTS

| 3,429,641 | 2/1969 | Fowler | 359/301 |
| 4,464,018 | 7/1984 | Gagnon | 350/331 R |
| 5,013,140 | 5/1991 | Healey et al. | 350/347 E |

FOREIGN PATENT DOCUMENTS

| 313681 | 5/1989 | European Pat. Off. |
| 322714 | 7/1989 | European Pat. Off. |
| 1372436 | 11/1964 | France. |
| 773217 | 4/1957 | United Kingdom. |

Primary Examiner—Frank Gonzalez
Attorney, Agent, or Firm—Oblon, Spivak, McClelland, Maier & Neustadt

[57] ABSTRACT

In a device for the projection of images by means of liquid crystal panels, the two orthogonal components of light are used to build the image to be projected, thus giving a significant improvement in efficiency. To this end, before going through a liquid crystal panel, the light is separated into two beams having different directions as a function of their polarization, by means of a phase separator and then, after having undergone a phase modulation by the liquid crystal panel, these two beams are recombined to build the image given by the liquid crystal panel.

14 Claims, 3 Drawing Sheets

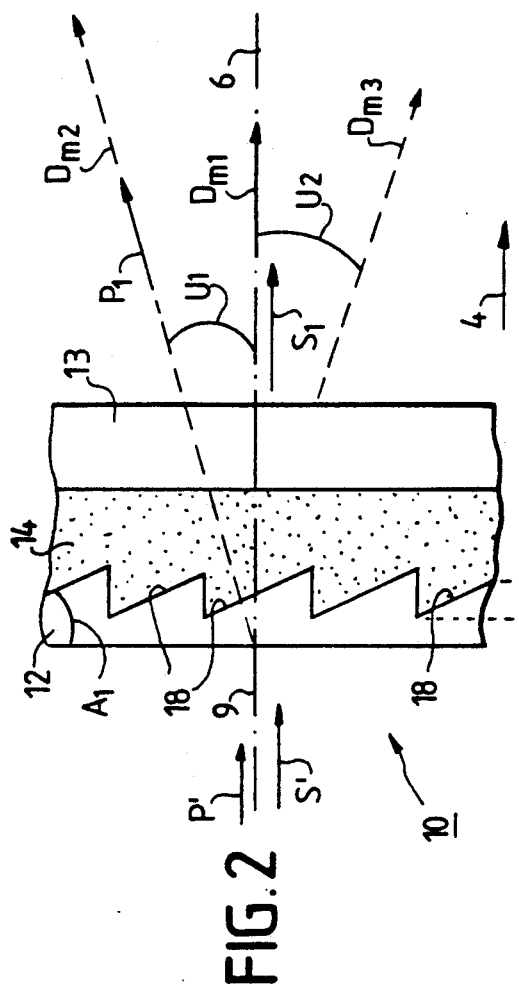
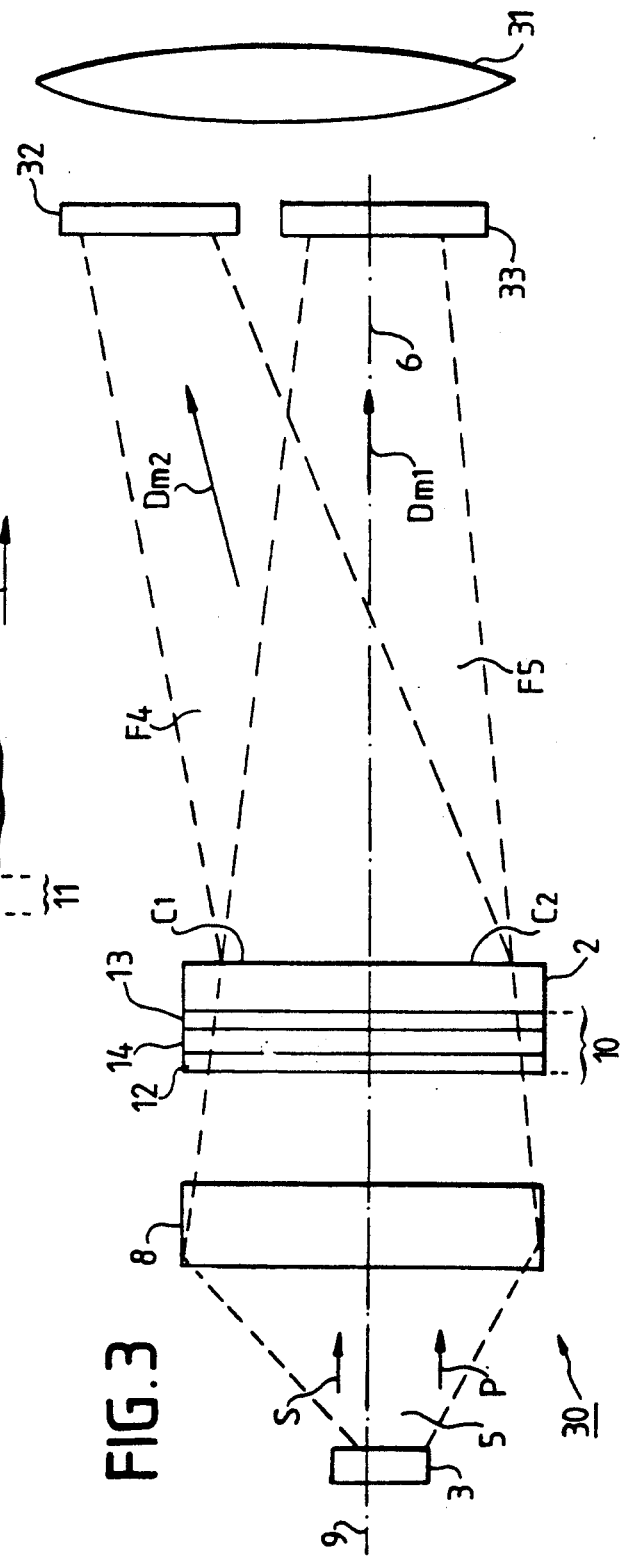
FIG. 2
FIG. 3

DEVICE FOR THE PROJECTION OF IMAGES

BACKGROUND OF THE INVENTION

1. Field of the Invention

The invention relates to a device for the projection of images in which the light is modulated by its passage through light polarization modulators that are constituted, for example, by the liquid crystal cells of a matrix-addressed liquid crystal panel. An object of the invention is a new arrangement that enables considerable improvement in the luminous efficiency of such projection devices, especially but not exclusively in the field of professional instruments.

2. Description of the Prior Art

In the standard image projectors using a matrix-addressed liquid crystal panel, each liquid crystal cell of this panel corresponds to an image element or picture element. To simplify the description, if we take the case where each image element may be at the maximum level of "white" or at the maximum level of "black", a cell affects a light that goes through it by modifying or not modifying its polarization depending on whether the cell is in the so-called "on" state or in the so-called "off" state, i.e. depending on whether or not an electrical field is applied to the liquid crystal cell.

In general, the light used is initially of the non-polarized type. This light is taken to have two components with orthogonal planes of polarization. Before it is applied to the liquid crystal panel, the light goes through a device known as a polarizer which rids it of one component with a given polarization so that only the other component with the other polarization is subjected, as the case may be, to the effect of the liquid crystal cells.

After having gone through the cells, the light may again have both types of polarization in a spatial distribution that is a function of the spatial distribution of the cells in the "on" state and in the "off" state. The display of the two states of the cells is obtained by then making the light pass through a polarization analysis means making it possible to carry out a polarization analysis and to act on at least one of the two components as a function of its polarization.

In the present case, this means of analysis enables one of the polarizations to be transmitted and the other to be absorbed, that is, it works like the above-mentioned polarizer.

It must be noted that, among the devices that come within the category of polarization analysis means, such as those defined above, we might cite devices known as polarization separators, the function of which is more specifically to separate the two differently polarized components into two beams having different directions as a function of their polarization.

It is observed that, in the working of a prior art projector such as the one described here above, before the light is made to go through the liquid crystal panel, one of the two polarizations of this light has to be absorbed. This results in a 50% loss of light, to which we must add losses in transmission in the polarizer and the means of analysis.

SUMMARY OF THE INVENTION

One of the main aims of the present invention is that of significantly improving the ratio of the light useful to the image to the available light, in an image projector of the type using a polarization modulator such as, for example, a liquid crystal panel.

With the invention, this aim is achieved by means of a new arrangement that has the effect, notably, of enabling the use of the two orthogonal components of polarization of light to build the projected image.

According to the invention, there is proposed a projection device including:

a source of light;

a polarization modulator to modulate the polarization of the light as a function of the image to be projected, wherein said device further comprises:

a polarization separator placed between the source and the modulator and enabling the light to be separated into a second beam and a third beam having different directions as a function of their polarization, these two beams being applied to the polarization modulator whence they emerge respectively in the form of a fourth beam and a fifth beam;

a means of analysis of the polarizations placed opposite the separator in relation to the polarization modulator, said means of analysis receiving the fourth beam and the fifth beam on which they enable a polarization analysis to be performed on each of the beams, said fourth beam and fifth beam being used to build the image to be projected.

BRIEF DESCRIPTION OF THE DRAWINGS

The invention will be understood more clearly from the following description of a non-restrictive example, made with reference to the appended drawings, of which:

FIG. 2 gives a schematic view of the structure of a polarization separator used in the invention;

FIG. 3 illustrates a version of the invention using a single polarization separator shown in FIG. 2;

DETAILED DESCRIPTION OF THE INVENTION

Figure 1:
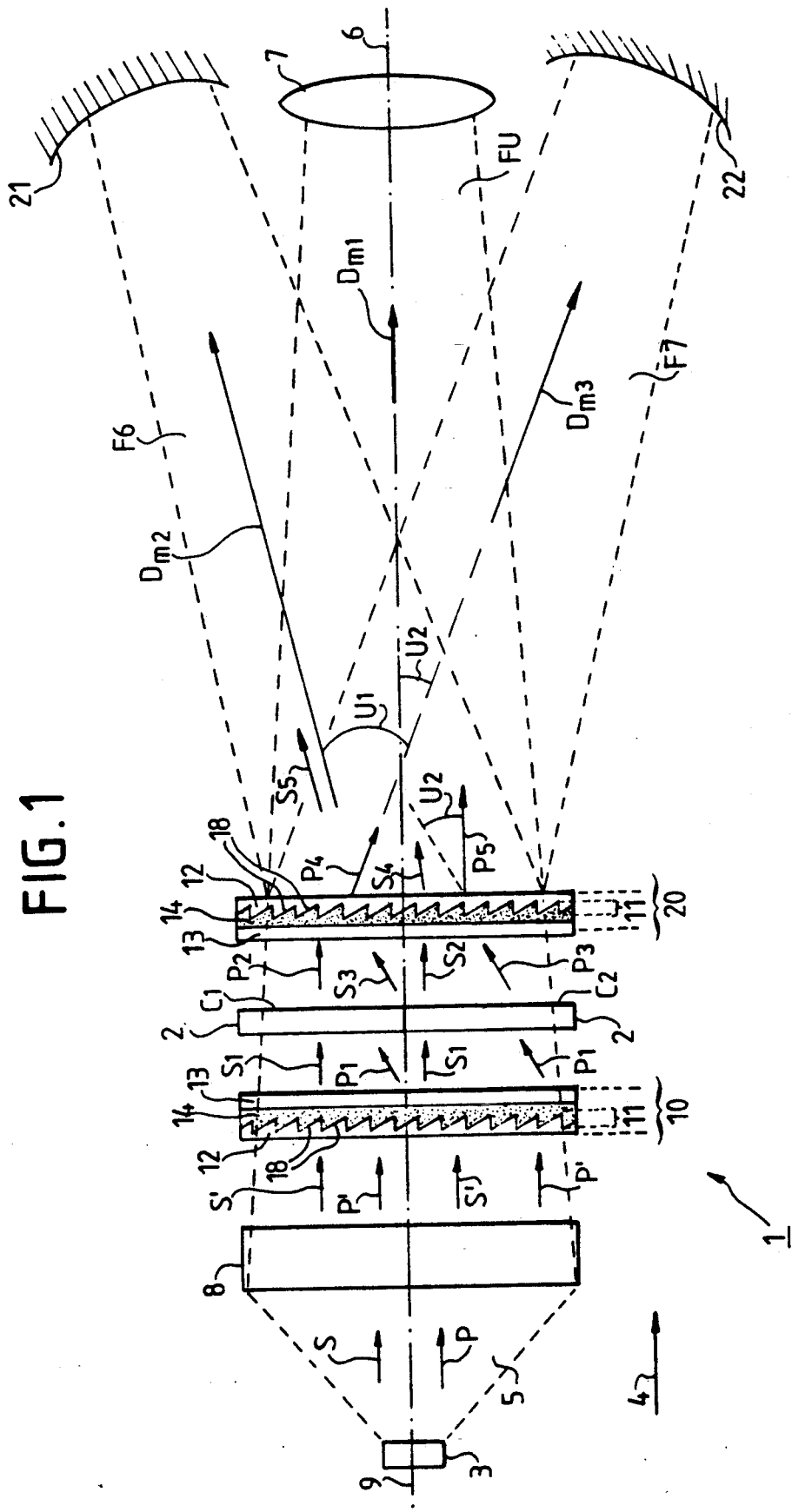
FIG. 1 gives a schematic view of a preferred embodiment of an image projector according to the invention.

FIG. 1 shows an exemplary non-restrictive view of an image projector 1 according to the invention, using a liquid crystal panel 2 to modulate the polarization of light as a function of an image to be projected.

It is clear that such a modulation can be achieved by any other means capable, like liquid crystal cells, of modulating the polarization of light such as, for example, magneto-optic modulators using the Faraday effect.

The liquid crystal panel 2 is a matrix-addressed panel that is standard per se. This panel 2 is formed, for example, by a plurality of liquid crystal cells arranged in lines and columns, the lines of cells being, for example, perpendicular to the plane of the FIG.. In FIG. 1, the panel 2 is seen as a column having only two cells, C1 and C2, to simplify the description.

In this first version of the invention, the cells C1, C2 are of the 90° twisted nematic type. In the non-restrictive example described, these cells C1, C2 achieve a 90° rotation of the polarization of the light that crosses them when no electrical field is applied to them, i.e. when there are in the so-called "off" state. To simplify the description, we shall assume that the cells work in "all or nothing" mode, i.e. that the polarizations are in no way modified when the cells C1, C2 are in the opposite state known as the "on" state which corresponds to the application of an electrical field.

The projector 1 has a light source 3 that produces a so-called "non-polarized" light 5 which is assumed to have two components having orthogonal planes of polarization S, P.

The panel 2 and the source 3 are aligned on a source axis 9. In the non-restrictive example described, the source axis 9 is the same as an optic axis 6 on which a projection objective 7 is centered. The objective 7 is designed to receive the light that is useful to forming the image, in order to provide for its projection on a display panel for example (not shown). The light 5 constitutes a first beam having the two polarizations S and P (represented by arrows). This first beam gets propagated in the direction indicated by the arrow 4. The first beam 5 goes through a condenser 8 that tends to focus it on the objective 7.

According to one characteristic of the invention, a polarization separator 10 is interposed between the source 3 and the panel 2, more precisely between the condenser 8 and the panel 2.

The function of the separator 10 is to give different angular directions to the two polarizations of the first beam 5, as described hereinafter with reference to FIGS. 1 and 2.

FIG. 2 shows a view in partial section, as a non-restrictive example, of the structure of the polarization separator 10. The separator 10 has a liquid crystal cell formed by two parallel transparent plates 12, 13, made of glass for example, between which the liquid crystal 14 is contained, the refractive index nl of the plates 12, 13 being 1.5 for example.

The birefringent nature of the liquid crystal 14 cooperates with a prismatic grating 11 to deflect only one of the two polarizations of the light produced by the source 3.

To this effect, the first plate 12, considered in the direction 4 of the propagation of the light, has a prismatic grating 11 etched in a face 16 of the plate 12, the face oriented towards the liquid crystal 14. This prismatic grating is formed by a succession of grooves 18 that extend in a plane perpendicular to the plane of the FIG. and appear sectionally in the FIG.. The optical axis 6 is perpendicular to the plane of the glass plates 12, 13 and to the plane containing the entire separator 10, and the grooves 18 constitute, along their section, a succession of faces or planes 18 forming sawteeth, each of these planes forming an angle of inclination Al with the plane of the plates 12, 13.

Furthermore, the liquid crystal forms a birefringent material such as is described, for example, in the French patent application No. 86 05239 published under No. 2 597 249. In a manner that is standard per se, the axis of orientation of the molecules of the liquid crystal is parallel to the plane of the planes 12, 13. The liquid crystal has two refractive indices n2, n3. One of these indices, n2, is substantially equal to the index nl of the glass, namely nl = 1.5 in the example, and is applicable to one of the polarizations, the first polarization S for example. The other index n3 is higher (of the order of 1.7 for example) and this other index n3 applies to the rays of the second polarization P.

An arrangement such as this enables the deflection of only one of the polarizations, the polarization P to which the highest index n3 is applied, at the plate/liquid-crystal interface 12-14.

The first polarization S, to which no index modification is applied between the plates 12, 13 and the crystal, goes through the separator 10 without any modification of its direction in this separator 10, and gets propagaged in a first mean direction Dml which is on the optic axis 6.

By contrast, for the second polarization P, the liquid crystal 14 has an index n3 which is higher than the index nl of the glass and the incident rays having this polarization are deflected at the glass/liquid-crystal interface 12-14 by an angle of deflection U2. The angle of inclination Al is chosen in combination with the value of the index n3 so that the deflection of the second polarization P is higher than the aperture of the objective 7, so that the rays coming from this polarization P fall outside the objective 7 as explained more clearly hereinafter in the description.

Thus, for example, in the case of rays S', P'coming from the condenser 8 and reaching the separator 10 with the polarizations S and P respectively and with mean directions parallel to the optic axis 6, i.e. normal to the plane of the plate 12: if we assume, for example, that the angle of inclination Al of the planes 18 is of the order of 45° and that the index n3 is 1.7, then the rays P' with a polarization P undergo a deviation and they emerge from separator 10 as rays Pl, the mean direction Dm2 of which forms a first angle of deflection Ul with respect to the optical axis 6 whereas, for the polarization S, the rays S' emerge from the separator as rays S1, the mean direction Dml of which is on the optic axis 6, i.e. this direction is unchanged.

Under these conditions, at the output of the separator 10, it is possible to find a second beam and third beam, Sl, Pl with different polarizations and different directions, respectively represented by the rays Sl and Pl; the second beam Sl represents the undeflected part of the first beam 5 having the polarization S, and the third beam Pl represents its deflected part with a polarization P.

It must be noted that the deflection of the rays P' having the second polarization P can be accomplished also in a third mean direction Dm3 shown in the FIG., along a second angle of deflection U2 having the same value as the first angle of deflection Ul but with the opposite sign. To this effect it would be enough, for example, to position the separator 10 for its orientation to be opposite the one shown in FIGS. 1 and 2, i.e. with the plate 13 on the source 3 side and the plate 12 (the plate that has the prismatic grating 11) on the panel 2 side, so that that the rays P' first cross the medium having the highest index n3 (liquid crystal) and then encounter the medium having the lower index nl (plate 12 with the prismatic grating 11).

Referring again more particularly to FIG. 1, the second and third beams Sl, Pl are applied to the panel 2, i.e. to the cells Cl, C2 of this panel. In order to provide a simultaneous illustration in FIG. 1 of the effects of the "on" and "off" states that the cells Cl, C2 may have, we shall assume that the second cell C2 is on the "on" state while the first cell Cl is in the "off" state.

Consequently, with regard to the second beam Sl with a polarization S:

as for its part that goes through the first cell Cl, its polarization has rotated and it emerges from this cell in the form of rays P2 having the polarization P and an unchanged mean direction Dml parallel to the optic axis 6, as for its part that goes through the second cell C2, it emerges with a same first mean direction Dml parallel to the optical axis 6 and a same polarization S, as symbolized by a ray S2.

With regard to the third beam Pl, with P type polarization:

as for its part that crosses the first cell C1, its polarization has rotated and it emerges as symbolized by a ray referenced S3 having an S type polarization and a same second mean direction Dm2, as for its part that crosses the second cell C2, it emerges in the form symbolized by a ray P3 with a same second mean direction Dm2 and a same polarization of the P type.

Thus, at output of the panel 2, we find:

firstly, a fourth beam having a mean direction Dm1 located on the optic axis 6 and formed by the rays P2, S2 with polarization P and S respectively;

secondly, a fifth beam, the mean direction Dm2 of which forms the above-mentioned first angle of deflection Ul with the optic axis 6. This fifth beam is formed by rays or beams P3, S3 with polarization P and S respectively.

In this version of the invention, according to one characteristic, a second phase separator 20 is interposed between the objective 7 and the panel 2.

This second separator 20 has the function, in cooperation with the first separator 10 and the panel 2, of carrying out this deflection on the rays having a P type polarization, this deflection having substantially one and the same value but a direction contrary to that of the first one (achieved by the first separator 10), so as to orient certain of the rays, that have already been deflected by the first separator 10, in parallel to the optic axis 6, certain of the rays having been already deflected by the first separator 10. However, this second deflection is achieved only for the ray with polarization P that have gone through a cell in the "on" state, i.e. in this example, for the ray that has gone through the second cell C2. In fact the second separator 20 must deflect the rays having a polarization that is the same as the one for which the first separator 10 produces deflections.

To this effect, the second separator 20 may be made in the same way as the first separator 10 but, in the example shown in FIG. 1, it must then be oriented in reverse to this separator 10 as mentioned here above. This means that, in the direction 4 of propagation, there is first of all the plate 13 and then the liquid crystal 14 and then, finally, the plate 12 including the prismatic grating 11. The second separator 20 has no effect on the S type polarization, but it affects the P type polarization.

Consequently, the rays S3 with a polarization S go through the second separator 20, whence they emerge in preserving the same direction as at input, i.e. with the second mean direction Dm2 that forms, with the optic angle 6, an angle having the same value and the same sign as the first angle of deflection Ul. These rays then constitute a sixth beam F6 having the second mean direction Dm2 and going beyond the objective 7, and therefore not constituting a part of the light used to build the image to be projected.

Furthermore, the rays S2, the polarization of which is also of the S type, go through the second separator 20. They emerge therefrom as rays S4: they too preserve their direction in such a way that these rays S4 have a mean direction on the optic axis 6 and reach the objective 7 to form the image to be projected.

With respect to the rays having a P type polarization:

the rays P2 are deflected while crossing the second separator 20, in the opposite direction to the deflection made at the first separator 10. Consequently, these rays emerge from the separator 20 as rays P4 that constitute a seventh beam F7, the mean direction Dm3 of which deviates from the optic axis 6 along the second angle of deflection U2 having a same value as the first angle of deflection Ul but with the opposite sign. This beam F7 goes outside the objective 7, and does not constitute a part of light used to build the image to be projected, the rays P3, the mean direction Dm2 of which deviates from the optic axis 6 before they reach the second separator 20, are deflected in this separator by an angle of deflection U2 in a direction opposite that of the deflection effected in the first separator 10 in such a way that, at the output of the second separator 20, they are represented by a ray P5, the mean direction of which is parallel to the optic axis 6.

Thus, the ray or rays P5 having a P type polarization have the first mean direction Dml and reach the objective 7 and, with the rays S4 having the S type polarization, they constitute a useful beam FU that has both types of polarization and is used to form the image to be projected.

The sixth and seventh beams F6, F7 represent a quantity of light that is all the higher as the mean light level of the image is low.

Within the scope of the invention, this quantity of light may be recovered by using for example a mirror 21, 22 for each of the sixth and seventh beams S4, P4. Each of these beams may then be reflected towards the source 3 in taking a path (not shown) that is the reverse of the above-described path, in going successively through the second separator 20, the panel 2 and the first separator 10; a reflector (not shown) may of course be associated with the source 3.

In the non-restrictive example described with reference to FIG. 1, the two separators 10, 20 are made identically. They differ, firstly, by their position upline and downline of the modulator 2 and, secondly, by their orientation. The orientation of the first separator 10 is such that the first plate 12 (which bears the prismatic grating 11) is oriented towards the source 3 while the second separator 20 has a contrary orientation with the first plate 12 pointed towards the objective. The result thereof is that between these two separators 10, 20, the successive planes 18 (which form a prismatic grating 11) are parallel.

However, it is also possible to obtain a useful beam similar to the useful beam FU, and two beams with opposite polarizations similar to the sixth and seventh beams F6, F7 by means of an assembly (not shown) in which the two polarizers that sandwich the modulator 2 would have prismatic gratings that are symmetrical with respect to the modulator 2.

For example, in an assembly such as this, with the first separator 10 located upline of the modulator 2 being unchanged, the second separator located downline may be oriented like the second separator 20 and it may have a prismatic grating, the planes of which, for example the planes 18, are antiparallel to the planes 18 of the first polarizer 10. In this case, the axis of the useful beam emerging from the second polarizer and used to build the image to be projected, namely the optic axis on which the projection objective is centered, is offset angularly with respect to the source axis 9. For example, in such a case, the axis of this useful beam may be like the second mean direction Dm2, shown in FIG. 5, with the beams of non-useful light such as the sixth and seventh beams F6, F7 on either side, the angle formed between the source axis 9 and the axis of this useful beam being similar to the first angle of deflection U1.

Figure 4:
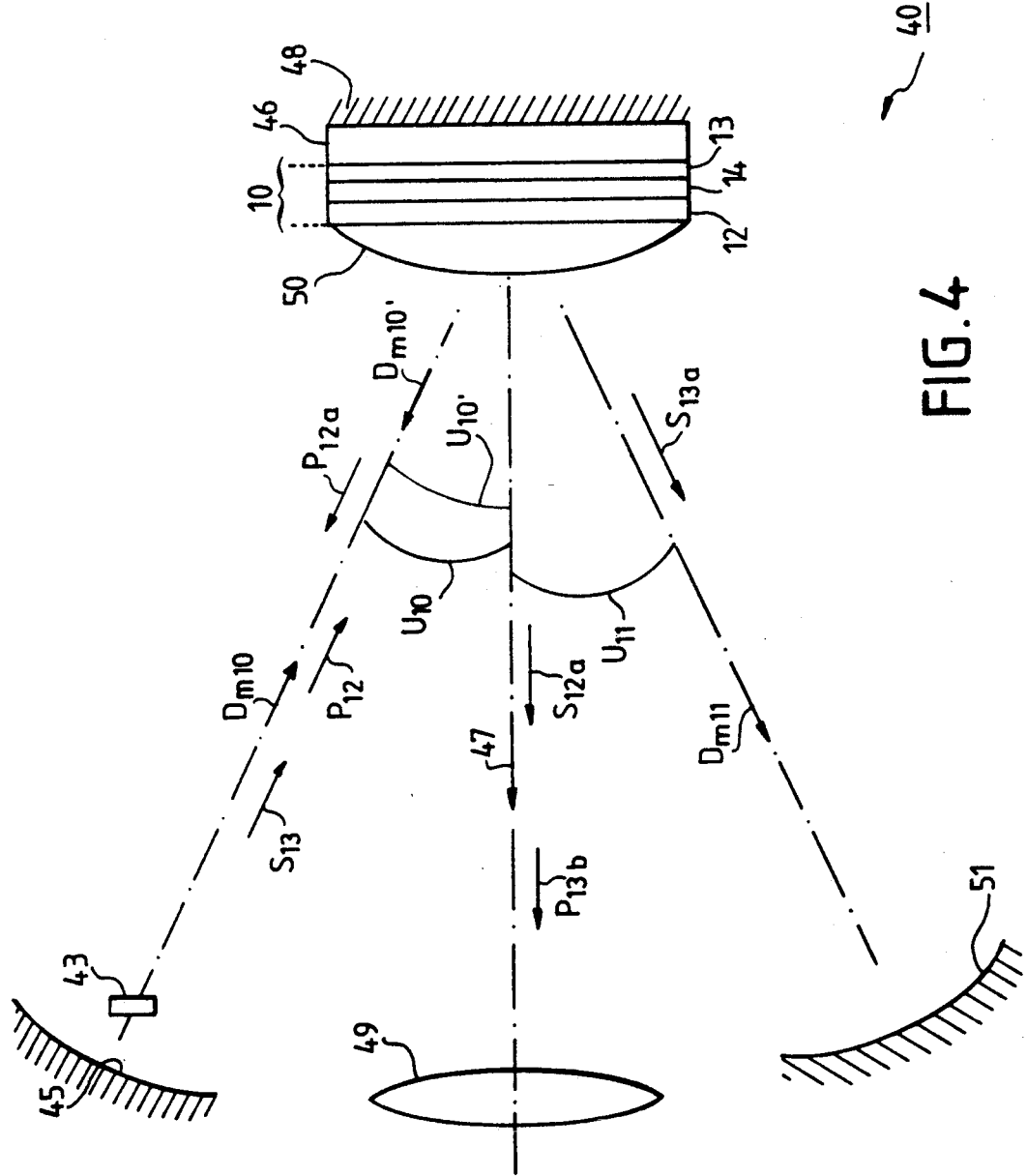
FIG. 4 gives a schematic view of a variant of the invention in an assembly working in reflection mode.

This possibility of an operation with both the prismatic gratings arranged symmetrically, with respect to the modulator 2, may be used in an assembly of the reflection type as described in greater detail in a subsequent part of the description pertaining to FIG. 4.

FIG. 3 gives a schematic view of a projector 30 according to the invention in a version wherein the deflection of the rays with a given type of polarization is done solely at a first separator 10.

The projector 30 has a source 3, a condenser 8, a first separator 10, a panel 2, the organization and working of which are the same as in the example of FIG. 1. As in the case of FIG. 1, the source axis 9 and the optic axis 6 are the same.

At the output of the panel 2, and as in the above example, there is a fourth beam F4 formed by the rays P2, S2 having the first mean direction Dm1 and a fifth beam F5 formed by the rays P3 and S3 having the second mean direction Dm2. Each beam F4, F5 has both types of polarization P and S, one of which is crossed by the first cell C1 and the other by the second cell C2. Thus, it is enough to filter each of these beams F4, F5 to leave only the polarization that represents a useful light for building the image to be projected.

To this end there is interposed, between the panel 2 and an objective 31 receiving the two beams F4, F5 as shown in FIG. 3, a first analyzer or polarizer 32 positioned on the path of the beam F4 and a second polarizer 33 on the path of the beam F5. The first polarizer 32 absorbs the P type polarization and the second polarizer absorbs the S type polarization in such a way that the second objective 31 is illuminated only by rays that have crossed the second cell C2 in the "on" state, namely the rays S2 and P3.

FIG. 4 gives a schematic view of an application of the invention to a projector 40 of the type working in reflection mode.

The light is produced by an assembly formed by a source 43 and a reflector 45. The polarization of the light is modulated by a second liquid crystal panel 46 of the matrix addressed type for example. The light gets propagated from the source 43 towards the screen 46 with a mean direction Dm10 which is on the source axis 9. The source axis 9 forms an angle U10 with an axis 47 perpendicular to the plane of the second panel 46.

As in the example of FIG. 1, a phase separator 10 (having a same structure as the one shown in FIG. 2) is interposed between the second panel 46 and the source 43.

A main mirror 48 is positioned behind the second panel 46 in such a way that this panel is placed between the separator 10 and this main mirror 48. The separator 10, the second panel 46 and the main mirror 48 are aligned on the axis 47 which constitutes a main optic axis on which there is furthermore located a projection objective 49: the optic axis 47 is normal to the planes of the separator 10, that of the second panel 46 and that of the main mirror 48. In the non-restrictive example described, a lens 50, called a field lens, is positioned on the optic axis 47 between the objective 49 and the separator 10 to which it may be attached, as shown in in FIG. 4, so as to form an assembly comprising, successively, the lens 50, the separator 10, the panel 46 and the main mirror 48. The function of the lens 50 notably has the function of re-making the image of the source 43 on the pupil of the objective 49.

The separator 10 has an effect on the two components of polarization P and polarization S of the light produced by the source 43. This effect is similar to that produced on the light coming from the source 3 shown in FIGS. 1 and 2. FIG. 4 shows these two polarizations P and S at 90° with respect to each other respectively referenced P12 and S13.

The second panel 46 has a plurality of liquid crystal cells (not shown) which conventionally cause the rotation or non-rotation of the polarization of the light that goes through them depending on whether or not they are in the "off" or "on" state. The second panel 46 is of a standard type per se and it differs from the first panel 2, described with reference to the FIGS. 1 and 3, in that the cells which it includes cause the rotation of the polarizations by 45° only, as for example in liquid crystal wrist watches working by reflection.

The rays P12 and S13 that go through the second panel 46 firstly undergo no rotation of polarization when they go through a cell in the "on" state. Secondly, when they go through a cell in the "off" state, they undergo a 45° rotation when they get propagated in the direction of the separator 10 towards the main mirror 48, plus another 45° rotation added to the first one when they get propagated from the main mirror 48 towards the separator 10 because they go through the same cell. Consequently, the rays coming from the source 43 and having a P type polarization, have an S type polarization when they emerge from the separator 10 after reflection on the main mirror and if they have gone through a cell in the "off" state.

Assuming that the angle of offset U10, formed between the source axis 9, i.e. between the mean direction Dm10 (of the light coming from the source 43) and the main optic axis 47 has a same value as the first angle of deflection U1 (shown in FIG. 2) according to which the polarization P is deflected in the separator 10, the rays with polarization P represented by the arrow P12 are deflected in the separator 10 in such a way that they penetrate the second panel 46 with a mean direction that is on the main optic axis 47. Then, the path of these rays with a polarization P is conditioned by their passage in the second panel 46, depending on whether they go through cells in the "on" state or in the "off" state:

in the case of the cells in the "on" state, these rays with a polarization P go through the cells without undergoing any rotation of their phase. Then they are reflected by the main mirror 48 in a mean direction that is on the main optic axis 47, i.e. towards the separator 10. Hence these rays go for a second time through the second panel 46, then for a second time through the separator 10 in which they are deflected a second time and whence they emerge as rays referenced P12a. However, owing to the fact that these rays successively encounter a higher index (of the liquid crystal) and then a lower index (of the glass), this second deflection is made in the direction contrary to that of the previous deflection, according to an angle of deflection U10' having the same value as the offset angle U10 but with an opposite sign. As a consequence, the rays P12a, which do not represent a part of light useful to the image, return towards the source 43 with a mean direction Dm10' that is on the source axis 9;

should they go through cells in the "off" state, these rays with a polarization P having, as their origin, the rays P12, undergo a 45° rotation of their polarization and are then reflected by the main mirror in a mean direction that is on the main optic axis 47. Then, these rays make a second crossing of the cell in the "off" state of the second panel 46 where their polarization undergoes an additional 45° polarization, giving 90° in all. This means that these rays then have an S type of polarization. These rays then go through the separator 10 in which they are not deflected owing to the fact that they have a polarization S. These rays emerge from the separator as rays referenced S12a with a mean direction that is on the main optic axis 47, and they are picked up by the objective 49 to constitute the image to be projected.

As for the rays S13 coming from the source 43 and having an S type polarization, they go through the separator 10 while preserving their orientation and penetrate the second panel with the same mean direction Dm10. For these rays S13, two cases have to be considered when they cross the panel 46, depending on whether they go through a cell in the "off" state or in the "on" state.

when they go through a cell in the "on" state, their polarization is not modified, and they are reflected by the main mirror 4 symmetrically with the source 43 with respect to the optic axis 47. They make a second crossing, in the opposite direction, of the panel 43 and the separator 10 whence they emerge as the rays referenced S13a, with a mean direction Dm11 that is different from main optic axis 47 with which they form an angle U11 having a same value as the offset angle U10 formed between the optic axis 47 and the source axis 9. Consequently, these rays S13a are not picked up by the objective and do not participate in the building of the image to be transmitted, in the second case, when they go through a cell in the "off" state towards the main mirror 48, their polarization rotates by 45°. Then, after reflection by the main mirror 48, the second crossing of the cell in the reverse direction provides an additional 45° rotation, giving 90° in all, and these rays then have a P type polarization. These rays have been first of all reflected by the mirror 48, symmetrically with the source 43 with respect to the main axis 47 towards the separator 10. In the separator 10, since these rays have a P type polarization, they are deflected by an angular value that is the same as that of as the offset angle U10 but with the opposite sign, in such a way that their mean direction is brought to the main optic axis 47. These rays referenced P13b emerge from the separator 10 towards the objective 49. They are picked up by this objective 49 and are used to build the image to be projected.

The rays S13a with a polarization S, which emerge from the separator 10 along the mean direction Dm11 which is different from that of the objective 49, constitute a non-useful beam of light. This beam is non-useful in the sense that it is not used to build the image to be projected. However, it is possible to use this light in order to increase the peak luminance of the projector when the mean luminous level of the image is low.

To this effect, it is possible to position an auxiliary mirror 51 on the path of the non-useful light beam S13a so as to reflect this beam towards the source 46. Thus we correct one defect of liquid crystal systems which is that they give a low overall light efficiency when the entire image is dark.

This description is a non-restrictive example. Other examples may be chosen using, for example, a twisted structure liquid crystal cell, or a 45° half-wave cell in transmission or, again, a quarter-wave cell in reflection, without thereby going beyond the scope of the invention, provided that a phase separator is used for the spatial separation of the two components of orthogonal polarization to modulate them by the liquid crystal panel before recombining these two components.

It should be further noted that, in the different exemplary embodiments shown in FIGS. 1, 3, 4, the separator or separators 10, 20 may be attached to the modulator, i.e. to the liquid matrix panel 2, 46, and that the glass plates 12, 13 of the separators 10, 20 may form, at the same time, the wall of a liquid crystal matrix panel 2, 46.

What is claimed is:

1. A projection device including:
    a source of light;
    a polarization modulator to modulate the polarization of the light as a function of the image to be projected,
    wherein said device further comprises:
        a polarization separator placed between the source and the modulator and enabling the light to be separated into a second beam and a third beam having different directions, these two beams being applied to the polarization modulator whence they emerge respectively in the form of a fourth beam and a fifth beam;
        a means of analysis of the polarizations placed opposite the separator in relation to the polarization modulator, said means of analysis receiving the fourth beam and the fifth beam on which they enable a polarization analysis to be performed on each of the beams, said fourth beam and fifth beam being used to build the image to be projected.

2. A device according to claim 1, wherein the means of analysis include a second polarization separator receiving the fourth beam and the fifth beam out of which they enable the making of, firstly, a useful beam and, secondly, two beams of non-useful light.

3. A device according to claim 1, wherein the polarization modulator is a liquid crystal panel.

4. A device according to claim 1, wherein at least one phase separator includes a prismatic grating cooperating with a birefringent type of medium.

5. A device according to claim 2, wherein the second phase separator acts on rays having a same polarization as the rays on which the first separator acts.

6. A device according to claim 2, wherein the two phase separators produce deflections along angles of deflection having values that are substantially equal but with opposite signs.

7. A device according to claim 2, wherein a mirror is placed on the path of at least one of the beams of non-useful light in order to reflect this light towards the source.

8. A device according to claim 1, wherein the means of analysis include a first polarizer and a second polarizer placed respectively on the path of the fourth beam and the fifth beam.

9. A device according to claim 8, wherein the polarizers absorb different components of light having polarizations at 90° with respect to each other.

10. A device according to claim 1, wherein it is of the type working in reflection mode and wherein the phase modulator is followed, opposite the first phase separator, by a main mirror.

11. A device according to claim 10, wherein the phase separator, the modulator and the main mirror are aligned on a main optic axis and wherein the source is located on a source axis forming, with the main optic axis, an angle with a value that is substantially the same as that of an angle of deflection along which the rays of a given polarization are deflected in the phase separator.

12. A device according to claim 11, further comprising an auxiliary mirror enabling the reflection, towards the source, of a beam of light not oriented along the main optic axis.

13. A device according to claim 2, wherein the two phase separators include a prismatic grating having faces that are inclined with respect to the plane of the separator and wherein the two separators of said faces are parallel;

14. A device according to claim 2, wherein the two phase separators include a prismatic grating having faces inclined with respect to the plane of the separator and wherein, between the two separators, said faces are substantially symmetrical with respect to the polarization modulator.

* * * * *